(12) United States Patent
Wang et al.

(10) Patent No.: US 11,978,919 B2
(45) Date of Patent: May 7, 2024

(54) BATTERY SAFETY VENT ASSEMBLY

(71) Applicant: HYDRO-QUÉBEC, Quebec (CA)

(72) Inventors: Pu Wang, Quebec (CA); Mustapha El Mazouzi, Quebec (CA); Karim Zaghib, Quebec (CA)

(73) Assignee: HYDRO-QUÉBEC, Quebec (CA)

( * ) Notice: Subject to any disclaimer, the term of this patent is extended or adjusted under 35 U.S.C. 154(b) by 199 days.

(21) Appl. No.: 17/259,265

(22) PCT Filed: Jul. 10, 2019

(86) PCT No.: PCT/CA2019/050947
§ 371 (c)(1),
(2) Date: Jan. 11, 2021

(87) PCT Pub. No.: WO2020/010453
PCT Pub. Date: Jan. 16, 2020

(65) Prior Publication Data
US 2021/0273288 A1    Sep. 2, 2021

Related U.S. Application Data

(60) Provisional application No. 62/697,861, filed on Jul. 13, 2018.

(51) Int. Cl.
*H01M 50/342* (2021.01)
*H01M 50/107* (2021.01)
*H01M 50/578* (2021.01)

(52) U.S. Cl.
CPC ..... *H01M 50/3425* (2021.01); *H01M 50/107* (2021.01); *H01M 50/578* (2021.01); *H01M 2200/20* (2013.01)

(58) Field of Classification Search
CPC .......... H01M 50/3425; H01M 50/107; H01M 50/578; H01M 2200/20
See application file for complete search history.

(56) References Cited

U.S. PATENT DOCUMENTS 4,822,377 A    4/1989  Wolff
4,943,497 A    7/1990  Oishi et al.
(Continued)

FOREIGN PATENT DOCUMENTS

CA    2099657        2/1994
CA    2129558 A1    2/1996
(Continued)

*Primary Examiner* — Matthew T Martin
*Assistant Examiner* — Grace Ann Kenlaw
(74) *Attorney, Agent, or Firm* — Muirhead and Saturnelli, LLC

(57) ABSTRACT

A battery safety vent assembly for a battery casing with an upper surrounding clamp-like shape is disclosed. The assembly has a positive cap, a safety vent disk extending under a disk element of the positive cap, a gasket insulator snugly fitting into the clamp-like shape of the battery casing and providing support to the positive cap, the safety vent disk and a circuit interrupt device embedded in an underside recess area of the gasket insulator. The circuit interrupt device is coupled to a button downwardly projecting from the safety vent disk. Gas release passages, openings and interfaces between parts of the assembly are arranged so that when gas pressure inside the battery casing exceeds a predetermined threshold limit of pressure, weak lines in the safety vent disk allow gas to safely exit the battery casing.

21 Claims, 2 Drawing Sheets

(56) References Cited

U.S. PATENT DOCUMENTS

| | | |
|---|---|---|
| 5,418,082 A | 5/1995 | Taki et al. |
| 5,853,912 A | 12/1998 | Naing et al. |
| 6,274,264 B1 | 8/2001 | Azema |
| RE43,063 E | 1/2012 | Kim |
| 8,927,123 B2 * | 1/2015 | Lee .................. H01M 50/3425 429/174 |
| 8,968,898 B2 | 3/2015 | Lee et al. |
| 9,178,190 B2 | 11/2015 | Kim et al. |
| 2007/0172728 A1 | 7/2007 | Yamashita et al. |
| 2008/0171260 A1 * | 7/2008 | Kim .................... H01M 50/325 429/82 |
| 2008/0220316 A1 | 9/2008 | Berkowitz et al. |
| 2009/0233157 A1 * | 9/2009 | Kim .................... H01M 50/167 429/53 |
| 2010/0215997 A1 * | 8/2010 | Byun ................ H01M 50/3425 429/61 |
| 2011/0117398 A1 * | 5/2011 | Kang .................. H01M 50/578 429/170 |
| 2014/0045000 A1 * | 2/2014 | Kim .................. H01M 50/3425 429/56 |
| 2016/0099443 A1 | 4/2016 | Lee et al. |
| 2017/0117516 A1 * | 4/2017 | Jung .................. H01M 50/172 |
| 2017/0133645 A1 * | 5/2017 | Miyata ............. H01M 10/0587 |
| 2018/0047949 A1 * | 2/2018 | Sugimoto ......... H01M 10/0587 |

FOREIGN PATENT DOCUMENTS

| | | |
|---|---|---|
| CN | 101542775 A | 9/2009 |
| CN | 103155225 A | 6/2013 |
| CN | 103907220 A | 7/2014 |
| EP | 2 200 116 A2 | 5/2014 |
| JP | S49 105929 A1 | 10/1974 |
| JP | H 06196150 A | 7/1994 |
| KR | 10-2012-0041511 A | 5/2012 |
| KR | 2014 0106326 A1 | 9/2014 |

* cited by examiner

US 11,978,919 B2

BATTERY SAFETY VENT ASSEMBLY

FIELD OF THE INVENTION

The present invention relates to battery design, and more particularly to a battery safety vent assembly. In the present disclosure, the terms battery or electric battery are used for the sake of simplicity, but are interchangeable with the terms cell or electrical cell, generally of cylindrical shape but not limited thereto.

BACKGROUND

Safety of an electric battery is an important aspect to be considered, especially when a large number of batteries are assembled together in a battery pack as for an electric vehicle. Perforation or other damages may cause explosion or fire that must be limited for safety purposes.

It is desirable to provide such a battery with a device ensuring electrical conduction and sealing, but also safe use. This is usually achieved through battery cover assembly design. But existing cover assemblies are complex. They are prone to damages during the welding process due to excess energy transfer. They generally have restricted passage sections that limit release of gases resulting from battery reactions when damaged. The contact resistance in the cover assembly is often random and too high.

SUMMARY

An object of the invention is to provide a battery safety vent assembly that is simple in construction, highly cost-competitive, safety reliable and efficient.

According to an aspect of the invention, there is provided a battery safety vent assembly for a battery casing with an upper surrounding clamp-like shape, the battery safety vent assembly comprising:
- a positive cap having a disk element and a tip element upwardly protruding from the disk element, the tip element having a peripheral wall defining side openings spaced from one another and forming gas exits, the disk element having a downwardly projecting flange;
- a safety vent disk extending under the disk element of the positive cap, the safety vent disk having a peripheral rim portion fitting against the flange of the disk element of the positive cap, an arrangement of weak lines extending under the tip element of the positive cap and forming gas release openings for passage of gas when gas pressure inside the battery casing exceeds a predetermined threshold limit of pressure, and a downwardly projecting central button;
- a gasket insulator having a peripheral portion snugly fitting into the clamp-like shape of the battery casing and defining an inwardly directed slot receiving the flange of the disk element of the positive cap and the peripheral rim portion of the safety vent disk, and an inner portion defining a central opening and a downwardly projecting U-shaped channel with upper sideways shoulders in contact with the safety vent disk, the shoulder and a side wall of the U-shaped channel innermost with respect to a central upright axis of the battery safety vent assembly forming an underside recess area;
- a circuit interrupt device having a disk-like shape fitting in the underside recess area, the circuit interrupt device having upright through holes in communication with the central opening of the gasket insulator and being coupled to the button of the safety vent disk; and
- a positive tab downwardly projecting from the circuit interrupt device.

Thus, in a broad embodiment of the invention, the battery safety vent assembly may comprise four main parts such as a positive cap, a safety vent disk, a gasket insulator, and a circuit interrupt device.

BRIEF DESCRIPTION OF THE DRAWINGS

A detailed description of preferred embodiments will be given herein below with reference to the following drawings.

DETAILED DESCRIPTION OF THE PREFERRED EMBODIMENTS

Figure 1:
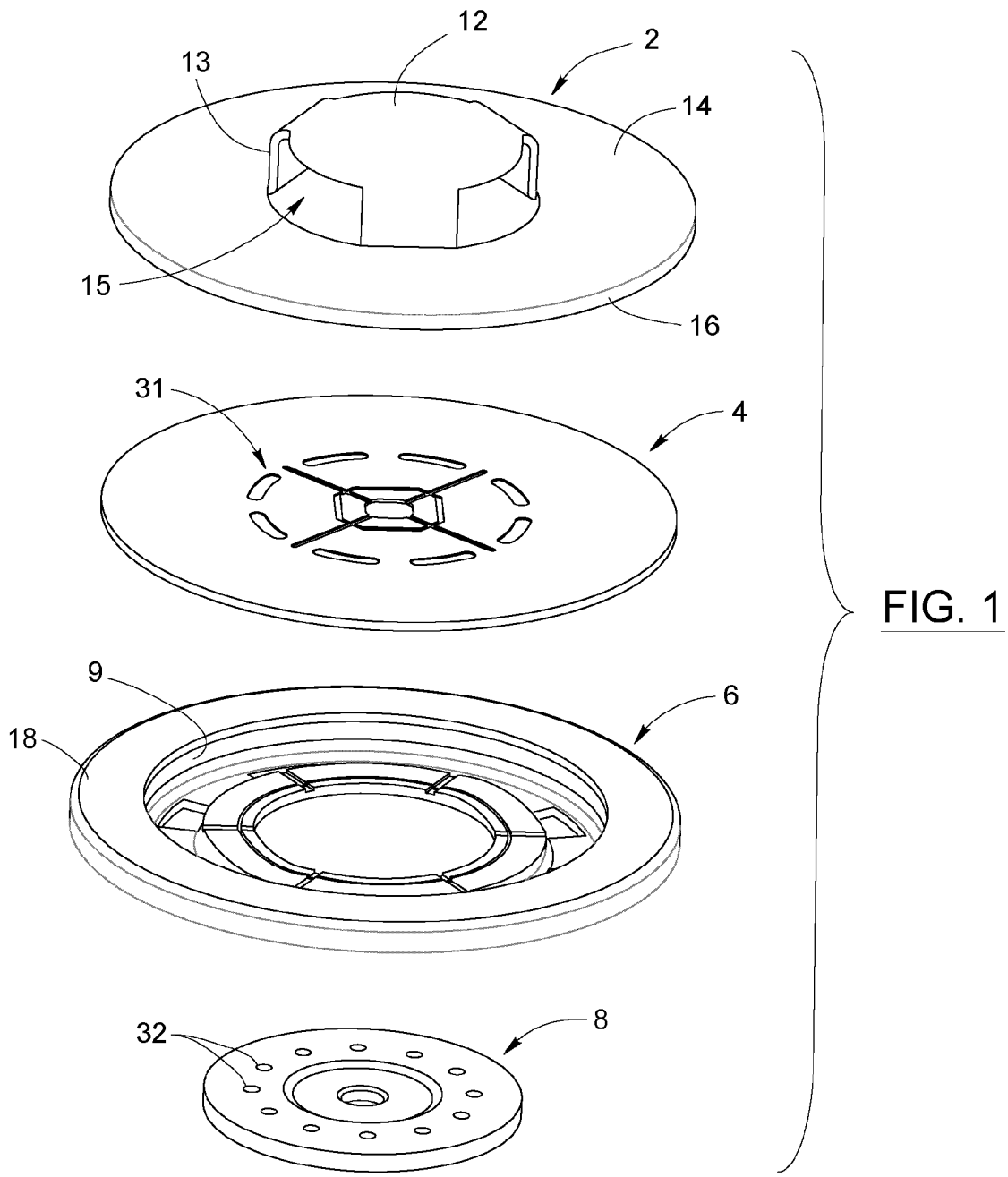
FIG. 1 is an exploded view of the battery safety vent assembly according to the invention.

Referring to FIG. 1, the battery safety vent assembly according to the invention has a top cover or positive cap 2, a safety vent disk 4, a gasket insulator 6, and a circuit interrupt device (CID) 8. The battery safety vent assembly may be crimp-mounted on an upper surrounding clamp-like shape of the battery casing 10 as shown in FIG. 2.

In an embodiment, the positive cap 2 has a tip element 12 upwardly protruding from a disk element 14. The tip element 12 has a peripheral wall 13 defining a number of side openings 15 spaced from one another, preferably three so their size is well appropriate, and preferably distributed around the circumference of the tip element 12, forming gas exits. The disk element 14 has a downwardly projecting flange 16, made for example by bending. The flange 16 advantageously grips to the safety vent disk 4 inside an inwardly directed slot 9 defined by a peripheral portion 18 of the gasket insulator 6 that snugly fits into and is supported by the clamp-like shape of the battery casing 10, as shown in FIG. 2. This arrangement is easy to manufactory assemble, and contributes to keeping a low impedance between the positive cap 2 and the safety vent disk 4. The flange 16 also forms a contact surface between the positive cap 2 and the gasket insulator 6 that contributes to prevent the battery from leaking. The contact surface of the positive cap 2 with the safety vent disk 4 may be welded by laser welding process for better electrical conductivity compared to the welding of other arrangements that involves multiple welding points, e.g. 10 points, instead of a generalized welding. Also, the proposed arrangement of the positive cap 2 with the safety vent disk 4 is advantageous in that when a positive tab 20 of the battery is welded, it will contribute to avoid damaging the safety vent disk 4 due to the energy of an ultrasonic welding process, which would possibly cause battery leakage because it is a supporting point that can transmit the energy of an ultrasonic welding process to the assembly. The positive cap 2 is preferably made of iron-plated nickel material, for resistor welding for example against the upper surface of the tip element 12.

Figure 2:
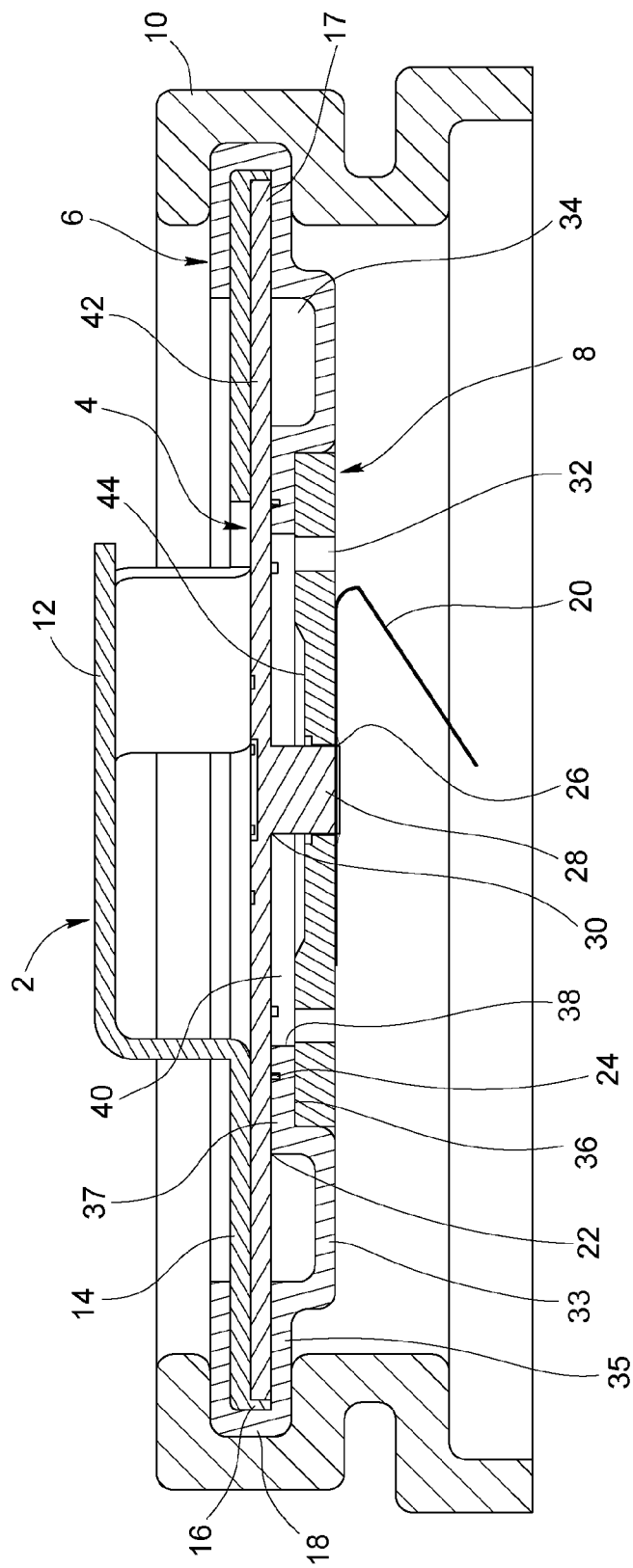
FIG. 2 is a cross-sectional view of the battery safety vent assembly according to the invention.

When assembled, the safety vent disk 4 extends under and in contact with the positive cap 2, as shown in FIG. 2. In an embodiment, the safety vent disk 4 has a peripheral rim portion 17 fitting against the flange 16 of the disk element 14 of the positive cap 2 and providing a contact surface against the gasket insulator 6 to prevent battery leakage. The contact surface may have an interface 22 especially intended to distribute energy of ultrasonic welding to the positive cap 2, instead of letting energy accumulate on the safety vent disk 4.

Referring to FIG. 2, the safety vent disk 4 preferably has a downwardly projecting pouch wall 24 inserting in a slot in an innermost shoulder 37 of the gasket insulator 6 and forming a support element for welding on the CID 8. When the positive tab 20, possibly made of aluminum, is welded against the CID 8, ultrasonic energy may then be transmitted to the safety vent disk 4 through the wall 24, instead of passing by the interface 26 of the CID 8 with a downwardly projecting central button 28 of the safety vent disk 4 and possibly the interface 30 of the button 28 with the generally washer-like portion 42 of the safety vent disk 4, which would possibly result in damaging the safety vent disk 4. The safety vent disk 4 is preferably stamped from pure aluminum, and has an arrangement of weak lines 31 (as shown in FIG. 1) extending under the tip element 12 of the positive cap 2 and forming gas release openings for passage of gas as long as the gas pressure inside the battery exceeds a predetermined threshold limit of pressure. The arrangement of weak lines 31 may form an outer series of circularly distributed weak lines spaced from one another, weak lines forming an X shape inwardly directed from the circularly distributed weak lines, and an inner octagonal series of weak lines close to the central button 28 of the safety vent disk 4 and cooperating with the weak lines forming the X shape. The button 28 of the safety vent disk 4 and the CID 8 have an interface 26 preferably laser welded and tearable by upward motion of the safety vent disk 4. If gas pressure inside the battery exceeds a predetermined threshold, the gas will pass through the opening 32, thereby pushing the safety vent disk 4 upwards, and eventually tearing the interface 26 and automatically shutting down the battery function and achieving protection.

The main purpose of the gasket insulator 6 is to form a sealing gasket to prevent the electrolyte of the battery from leaking through the safety vent assembly. It also prevents possible outside moisture from entering into the battery. In an embodiment, the gasket insulator 6 has an inner portion defining a central opening 40 and a downwardly projecting U-shaped channel 33 with upper sideways shoulders 35, 37 in contact with the safety vent disk 4. The U-shaped channel 33 provides a circular space 34 under the safety vent disk 4. The shoulder 37 and a side wall of the U-shaped channel 33 innermost with respect to a central upright axis of the safety vent assembly forms an underside recess area for snugly, tightly and clamp-like receiving the CID 8. The gasket insulator 6 is preferably made of plastic injected material so that its underside surface 36 may absorb the impact of ultrasonic welding energy applied to the bottom disk 8. In an embodiment, the thickness of the gasket insulator 6 especially at the inner portion defining an inner surface 38 is such that the CID 8 cannot rise and get in contact with the safety vent disk 4 in order to preserve a minimum gas release passage 40 for breaking the welded interface 26 and pushing up the button 28 of the safety vent disk 4 as a result of the gas pressure flow through the interface 26.

In an embodiment, the CID 8 has a disk-like shape snugly fitting in the underside recess area of the gasket insulator 6. The CID 8 has a number of upright through holes 32 preferably circumferentially distributed as best shown in FIG. 1, in communication with the central opening of the gasket insulator 6 to let possible gas generated inside the battery reach the space 40 against the safety vent disk 4. The CID 8 is preferably made of aluminum alloy providing an appropriate degree of rigidity preventing deformation that would impair with the purpose of forcing gas produced by the battery to break the welded interface 26. The rigidity also prevents undesired results due to possible pressure and mechanical vibrations when welding the aluminum tab 20 of the positive electrode to the bottom surface of the CID 8. The interface between the bottom disk 8 and the gasket insulator 6 allows welding energy to be distributed to the positive cap 2 through the surface 36 and the interface 22. The CID 8 may have an upper recess surface 44 promoting the breaking of the interface 26 at a desired gas pressure.

The battery safety vent assembly according to the invention has many advantages In order to reduce the complexity of the assembly of the battery cover; it integrates several functions in a single piece as formed by the gasket insulator 6. The gasket insulator 6 provides electrical insulation between the cathode and the anode of the battery, between the windings (not shown in the Figures) and the cathode, the dispersion of energy during the welding process, and the gas release in case of an opening of the safety valve formed by the safety vent disk 4. The assembly may advantageously be made of only four parts. Crimping the safety vent disk 4 with the cathode of the battery provides constancy and a reduction of the internal resistance of the battery cover.

While embodiments of the invention have been illustrated in the accompanying drawings and described above, it will be evident to those skilled in the art that modifications may be made therein without departing from the invention.

The invention claimed is:

1. A battery safety vent assembly for a battery casing with an upper surrounding clamp-like shape, the battery safety vent assembly comprising:
   a positive cap having a disk element and a tip element upwardly protruding from the disk element, the tip element having a peripheral wall defining side openings spaced from one another and forming gas exits, the disk element having a downwardly projecting flange;
   a safety vent disk extending under the disk element of the positive cap, the safety vent disk having a downwardly projecting central button, a flat peripheral rim portion fitting against the flange of the disk element of the positive cap, and a flat washer-like portion disposed between the downwardly projecting button and the flat peripheral rim portion and in a same plane as the flat peripheral rim portion, an arrangement of weak lines extending in the flat washer-like portion under the tip element of the positive cap and forming gas release openings for passage of gas when gas pressure inside the battery casing exceeds a predetermined threshold limit of pressure;
   a gasket insulator having a peripheral portion snugly fitting into the clamp-like shape of the battery casing and defining an inwardly directed slot receiving the flange of the disk element of the positive cap and the peripheral rim portion of the safety vent disk, and an inner portion defining a central opening and a downwardly projecting U-shaped channel with upper sideways shoulders in contact with the safety vent disk, one of the shoulders and a side wall of the U-shaped channel innermost with respect to a central upright axis of the battery safety vent assembly forming an underside recess area;
   a circuit interrupt device having a disk-like shape fitting in the underside recess area, the circuit interrupt device having upright through holes in communication with the central opening of the gasket insulator and being coupled to the button of the safety vent disk; and a positive tab downwardly projecting from the circuit interrupt device.

2. A battery safety vent assembly according to claim 1, wherein the gasket insulator is crimp-mounted in the upper surrounding clamp-like shape of the battery casing.

3. A battery safety vent assembly according to claim 1, wherein the side openings of the peripheral wall of the tip element of the positive cap are distributed around a circumference of the tip element.

4. A battery safety vent assembly according to claim 1, wherein the flange of the disk element of the positive cap is bent to grip the safety vent disk.

5. A battery safety vent assembly according to claim 1, wherein the flange of the disk element of the positive cap grips to the safety vent disk inside the slot of the peripheral portion of the gasket insulator.

6. A battery safety vent assembly according to claim 1, wherein the flange of the disk element forms a contact surface between the positive cap and the gasket insulator.

7. A battery safety vent assembly according to claim 6, wherein the contact surface includes a laser weld.

8. A battery safety vent assembly according to claim 1, wherein the positive tab is connected to the circuit interrupt device.

9. A battery safety vent assembly according to claim 1, wherein the positive cap is made of iron-plated nickel material.

10. A battery safety vent assembly according to claim 1, wherein the safety vent disk has a contact surface against the gasket insulator.

11. A battery safety vent assembly according to claim 10, wherein the contact surface of the safety vent disk forms an interface with the gasket insulator.

12. A battery safety vent assembly according to claim 1, wherein the safety vent disk has a downwardly projecting pouch wall inserting in a slot in an innermost one of the shoulders of the gasket insulator and forming a support element.

13. A battery safety vent assembly according to claim 1, wherein the positive tab is made of aluminum.

14. A battery safety vent assembly according to claim 1, wherein the safety vent disk is stamped from pure aluminum.

15. A battery safety vent assembly according to claim 1, wherein the arrangement of weak lines comprises an outer series of circularly distributed weak lines spaced from one another, weak lines forming an X shape inwardly directed from the circularly distributed weak lines, and an inner octagonal series of weak lines close to the central button of the safety vent disk.

16. A battery safety vent assembly according to claim 1, wherein the button of the safety vent disk and the circuit interrupt device have an interface that tears by upward motion of the safety vent disk in response to the gas pressure inside the battery casing exceeding the predetermined threshold limit of pressure.

17. A battery safety vent assembly according to claim 1, wherein the gasket insulator is made of plastic injected material.

18. A battery safety vent assembly according to claim 1, wherein the inner portion of the gasket insulator has a thickness preventing the circuit interrupt device from rising and getting in contact with the safety vent disk.

19. A battery safety vent assembly according to claim 1, wherein the upright through holes of the circuit interrupt device are circumferentially distributed.

20. A battery safety vent assembly according to claim 1, wherein the circuit interrupt device is made of aluminum alloy providing a predetermined degree of rigidity.

21. A battery safety vent assembly according to claim 1, wherein the circuit interrupt device has an upper recess surface.

\* \* \* \* \*